United States Patent [19]
Plegat

[11] 3,808,928
[45] May 7, 1974

[54] APPARATUS FOR CUTTING A CONTINUOUSLY ADVANCING TUBE INTO SECTIONS OF EQUAL LENGTH

[75] Inventor: Alain Edouard Plegat, Asnieres, France

[73] Assignee: Societe Anonyme Des Usines Chausson, Asnieres, France

[22] Filed: July 3, 1972

[21] Appl. No.: 268,616

[30] Foreign Application Priority Data
July 6, 1971 France .............................. 71.24618

[52] U.S. Cl. ........................ 83/289, 83/294, 83/306, 83/314, 83/318
[51] Int. Cl. ...................... B23d 45/02, B23d 45/20
[58] Field of Search ............ 83/244, 289, 307, 306, 83/308, 319

[56] References Cited
UNITED STATES PATENTS
3,267,783  8/1966  Kepes .............................. 83/319 X
2,737,703  3/1956  Van Clief, Jr. .................. 83/308 X
2,287,833  6/1942  Ridgway .......................... 83/294 X
2,473,559  6/1949  Anderson............................. 83/306
2,452,343  10/1948 Wilson................................. 83/306
1,367,564  2/1921  Pritchard ............................ 83/307
1,424,179  8/1922  Pritchard ............................ 83/307
2,416,653  2/1947  Stevens et al..................... 83/306 X Primary Examiner—J. M. Meister
Attorney, Agent, or Firm—Imirie and Smiley

[57] ABSTRACT

The present apparatus comprises a sliding carriage placed on a guide extending in parallel with a tube to be cut, said carriage supporting a cutting device and a means making the same fixed with the tube under a control order applied thereto through a detector detecting the distance of which the tube has been advanced.

7 Claims, 1 Drawing Figure

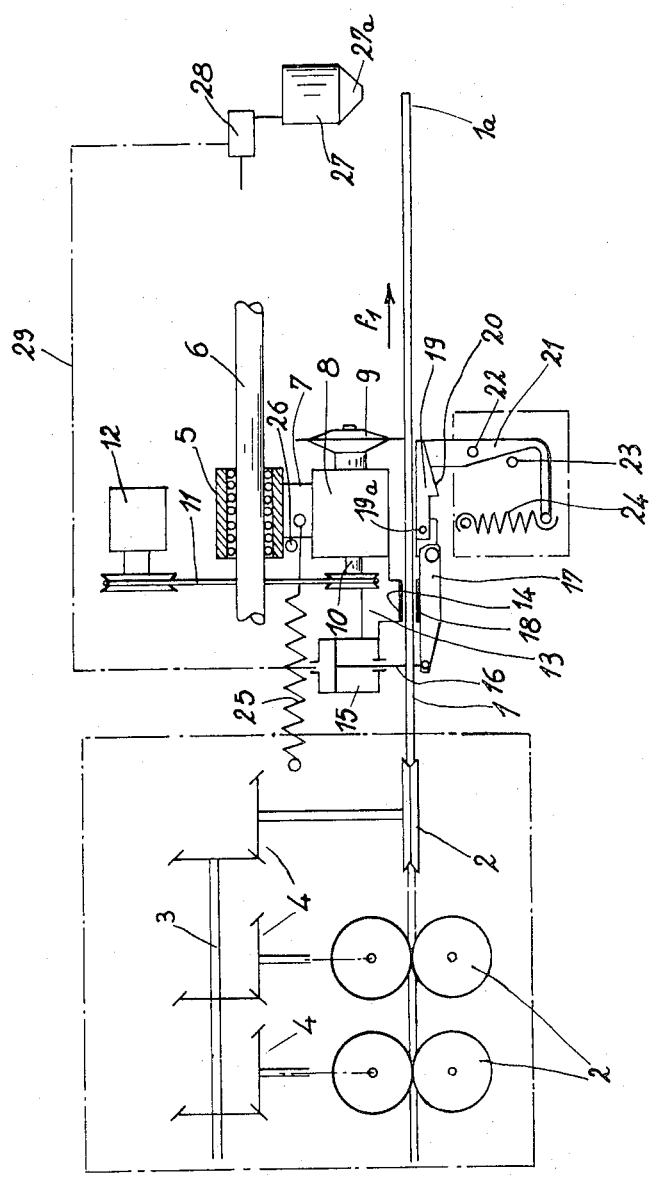

APPARATUS FOR CUTTING A CONTINUOUSLY ADVANCING TUBE INTO SECTIONS OF EQUAL LENGTH

The present invention relates to the cutting of various tubes and especially tubes which are utilized in the manufacture of heat exchangers and in many other fields.

This invention creates a new apparatus making if possible to cut a continuously advancing tube into sections of equal length and said apparatus is made entirely independent from the tube forming mechanisms whereby it can be embodied to cooperate with any tube manufacturing machine.

Due to the design of the apparatus of the invention, said apparatus provides for the cutting of the tube into sections having exactly the same length, even if the advance speed of the moving tube is not constant.

According to the invention, the apparatus for cutting a continuously moving tube into sections of equal length, comprises a sliding carriage placed on a guide extending in parallel with the tube to be cut, said sliding carriage supporting a cutting device and a means making the sliding carriage fixed with the tube under a control order applied to it by a detector of the distance which the tube to be cut has been advanced.

Various other characteristics of the invention are moreover shown in the following detailed description.

An embodiment of the invention is shown by way of a non-restrictive example in the accompanying drawing.

The only FIGURE is a diagram of the device for cutting a tube into sections, according to the invention.

In the drawing, reference numeral 1 designates a thin tube manufactured in continue from a strip which is shaped by means of a forming mechanism comprising sets of wheels 2 constituted in a well known way and driven into rotation, for example from a common shaft 3 and transmission means 4 represented by bevel pinions. The forming of the tube being realized in continuous manner by the set of wheels 2, it results therefrom that said tube is continuously advancing in continue at a constant or substantially constant speed.

The cutting mechanism is placed immediately after the forming mechanism which has been succinctly described above. Said cutting mechanism comprises a sliding means 5 constituted for example by a tube or sleeve with circulating balls, said tube or sleeve being driven on a guide 6. The sliding means 5 supports an arm 7 on which is placed a carriage 8 supporting a saw 9 which, in the illustrated embodiment, is driven by a shaft 10 connected through a pulley and a belt 11 to the output shaft of an electric motor 12.

The arm 7 also supports a square 13 forming a first jaw 14 and on said square is placed the body of a jack 15, the piston rod 16 thereof being coupled to a lever 17 forming a second jaw 18 placed opposite the jaw 14 and delimiting therewith a passage for the tube 1. The square 13 also supports a wedge-shaped part 19, the slope 20 thereof being directed towards a catch 21 pivotally mounted on a spindle 22 and kept bearing against a stop 23 by a spring 24.

In addition the arm 7 is connected to a spring 25 always tending to keep the same in the position represented, for example against a fixed stop 26. The apparatus also includes a detecting element 27 which can be constituted by an electrical micro-contactor, a fluid jet ejecting nozzle, an electrical cell or other element capable of sensing the moment when end $1a$ of the tube 1 is at the position of the sensitive head $27a$. The detector 27 controls a relay 28 having a time constant and which can be constituted by an electro-valve of which the output circuit 29 feeds the body of the jack 15 when end $1a$ of the tube is detected.

The feeding of the jack 15 causes the capture of tube 1 between the jaws 14 and 18, whereby the tube then drives, in the direction of arrow $f_1$, the square 13 and consequently the arm 7 which are both guided along the direction of the tube 1 by the guide 6. The wedge-shaped part 19 is moved in the same motion, the ramp 20 thereof bearing against the catch 21 which is prevented from rotating by the stop 23, resulting therefrom that the part 19 rotates around the pivot joint $19a$ thereof, which causes the tube 1 to bend and then to be cut by the saw 9.

When the carriage 8 has sufficiently advanced, the ramp 20 of the wedge 19 is released from the catch 21 and the wedge 19 returns substantially to its initial position where it does not cause the tube to bend any more. The time constant of the relay 28 is adjusted to stop the feeding of the body of jack 15 at that moment, whereby the jaws 14, 18 are released and the spring 25 returns the arm 7 to the original position thereof. During said return stroke, the ramp 20 of the wedge 19 comes again into contact with the catch 21, but in such a way that said catch is caused to rotate around its spindle 22, whereby the tube is not bent again into contact with the saw 9.

Though it has not been shown, the jack 15 can be replaced by a simple electro-magnet connected to the detector 27 through the relay 28 and controlling the lever 17 or an equivalent thereof. Also the jack and lever 17 can be replaced by an inductor of a linear motor supported by the square 13 if the nature of the material constituting the tube 1 makes possible for the same to act as an armature. It is also possible that the saw 9 be directly driven by an electric motor 12 supported by the arm 7 and in such a case, the electric motor is advantageously of the high frequency type so as to be as light as possible. Said electric motor can also itself be substituted by a gas turbine or other saw driving means.

Since the time interval existing between the moment whtn the end $1a$ of the tube is detected and the moment when the tube is tightened by the jaws 14, 18 remains constant for each tube section and the whole tube has only a low inertia, it is thus provided that the sections of tube, which are successively cut, are exactly of the same length. Further, the reciprocating motion of the saw being linear and perpendicular to the plane of the saw, eliminates the risk of a gyroscopic effect, to make possible the accomplishment of a very accurate cutting of the tube into sections.

The invention is not restricted to the embodiment shown and described in detail for various modifications thereof can moreover be applied to it without departing from the scope of the invention.

I claim:

1. Apparatus for cutting a continuously moving tube into sections of predetermined length comprising:
   a frame,
   a carriage reciprocable on said frame longitudinally of the tube,
   a cutting device fixedly mounted on the carriage, means carried by the reciprocable carriage to grip the tube in response to a control order.

return means for the carriage, control means detecting that a predetermined length of tube has moved past said carriage, said control means connected with said gripping means for providing said control order to said gripping means, said carriage further carrying a wedge-shaped pivotally mounted member disposed adjacent to the tube and just before said cutting device, and a catch member pivotally mounted on said frame in the path of said wedge-shaped member, said catch member cooperating with said wedge-shaped member on the forward stroke of the carriage such that said wedge-shaped member slides on the catch and pivots to bend the tube into engagement with the cutting device, said catch member on the return of the carriage rotating out of the path of said wedge-shaped member to release the same and preclude further cutting of the tube.

2. Apparatus as set forth in claim 1 wherein said carriage is supported and guided upon a sleeve sliding on a pipe carried by said frame and disposed in parallel to the path of said tube.

3. Apparatus as set forth in claim 1 wherein said control means comprises a detector placed in spaced relationship with respect to said cutting device for detecting the end of the tube to be cut.

4. Apparatus as set forth in claim 3 wherein said control means further comprises a time delay circuit connected at the output of said detector.

5. Apparatus as set forth in claim 1 wherein the gripping means comprises a jack connected to the output of the control means to receive the control order therefrom for actuating a pair of jaws movably disposed on said carriage to grip the tube under the control order.

6. Apparatus as set forth in claim 1 wherein said wedge-shaped member has a first surface disposed at an acute angle with respect to the path of travel of the tube and a second surface perpendicular to said path such that said wedge-shaped member slides on said catch along said first surface and thereafter drops back along said second surface to its initial position whereby the tube is moved into engagement with the cutting device during forward movement of the carriage and then is rapidly released to fall away from the cutting device for the return of said carriage.

7. Apparatus as set forth in claim 1 wherein said catch member comprises an L-shaped member pivotally rotatable from a first position engaged with a stop on said frame to a second position, said L-shaped catch member being spring biased into engagement with said stop for coaction with said wedge-shaped member and being rotatable away from said stop by movement of said wedge-shaped member during the return of said carriage.

* * * * *